July 29, 1952  M. G. WOODARD  2,604,720
FISHING LINE HOLDER
Filed April 12, 1948  2 SHEETS—SHEET 1
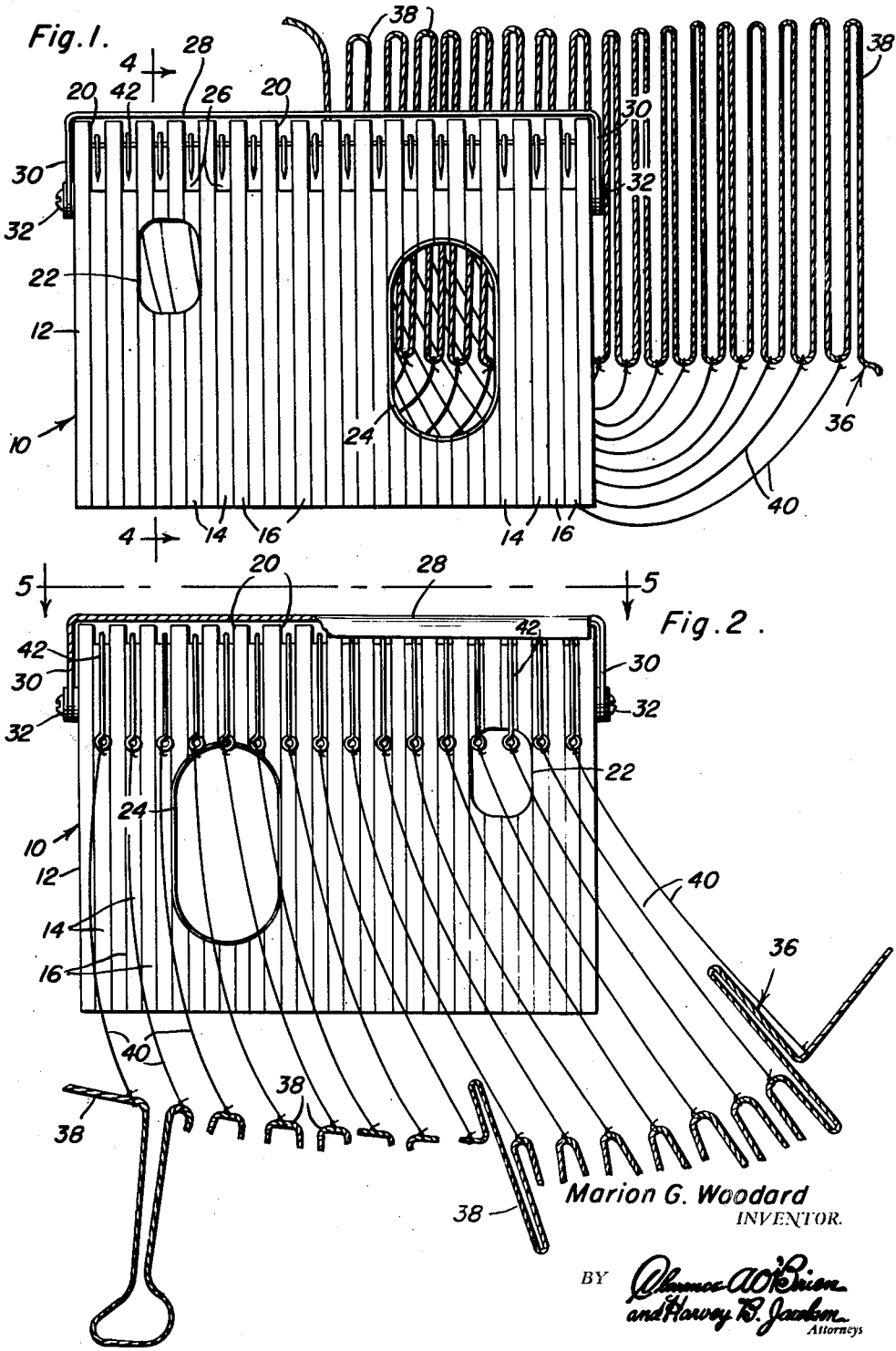
Marion G. Woodard
INVENTOR.

July 29, 1952   M. G. WOODARD   2,604,720
FISHING LINE HOLDER
Filed April 12, 1948   2 SHEETS—SHEET 2
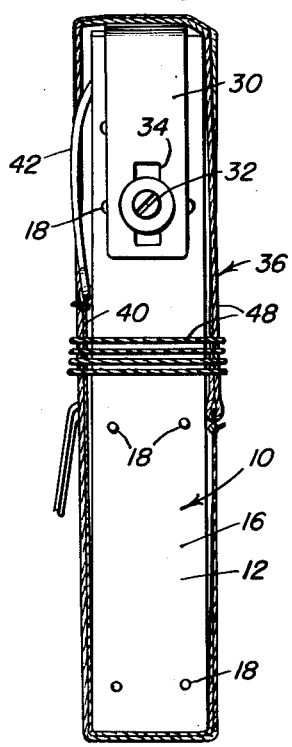
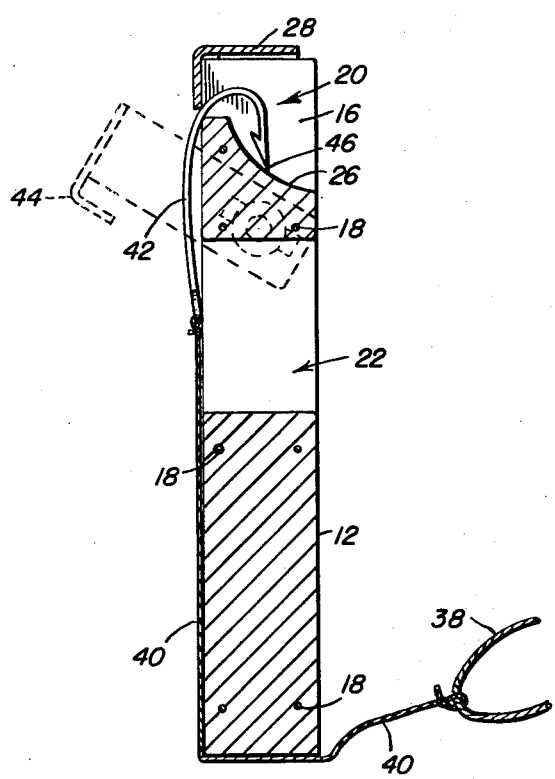
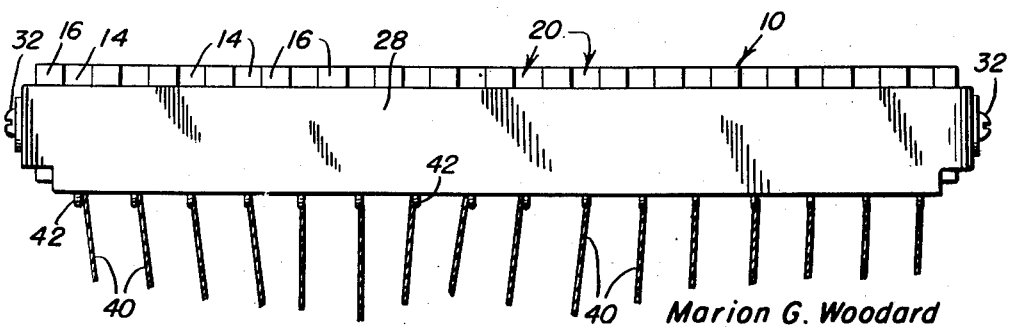
Marion G. Woodard
INVENTOR.

Patented July 29, 1952

2,604,720

UNITED STATES PATENT OFFICE 2,604,720

FISHING LINE HOLDER

Marion G. Woodard, San Antonio, Tex.

Application April 12, 1948, Serial No. 20,522

1 Claim. (Cl. 43—57.5)

This invention relates to new and useful improvements and structural refinements in holders for fishing lines, more specifically, fishing lines having a main line portion, a plurality of auxiliary line portions secured at one end thereof to the main line portion at predetermined intervals, and fishing hooks at the free ends of the auxiliary line portions, and the principal object of the invention is to facilitate the winding of such fishing lines upon the portable holder in an orderly manner, so as to prevent the various line portions from becoming entangled when the fishing line is not being used.

This object is achieved by the provision of a holder including a plate formed in one edge thereof with pockets to receive the fish hooks, the fishing line portions being windable around the plate in a neat manner, so that they may be readily removed therefrom, when desired.

An important feature of the invention resides in the provision of means for removably retaining the fishing hooks in their respective pockets, the retaining means, in turn, being normally held in its closed position by the fishing line wound around the plate.

An additional feature of the invention resides in the provision of a fishing line holder which is simple in construction, which may be easily and conveniently manipulated, which will not easily become damaged, and which will readily lend itself to economical manufacture.

With the above more important objects and features in view, and such other objects and features as may become apparent as this specification proceeds, the invention consists essentially of the arrangement and construction of parts as illustrated in the accompanying drawings, in which:

Figure 1 is a front elevational view of the invention.

Figure 2 is a rear elevational view thereof, the same being partially broken away to reveal its construction.

Figure 3 is an end view of the invention with the fishing line wrapped around the holder.

Figure 4 is a cross-sectional view, taken substantially in the plane of the line 4—4 in Figure 1, and Figure 5 is a top plan view, taken substantially in the plane of the line 5—5 in Figure 2.

Like characters of reference are employed to designate like parts in the specification and throughout the several views.

Referring now to the accompanying drawings in detail, the invention consists of a fishing line holder designated generally by the reference character 10, the same embodying in its construction a substantially rectangular plate 12 which may, if desired, be formed from a plurality of juxtaposed laminations 14, 16, rigidly secured together by adhesive or suitable fastening elements 18.

It is to be noted that the laminations 14 are somewhat shorter with respect to the laminations 16, each of the short laminations 14 being disposed between a pair of the relatively long laminations 16, thus resulting in the formation of what may be referred to as a row of notches or pockets 20 at one edge of the plate 12.

The plate 12 may, if desired, be formed integrally from one piece of material, in place of the fabricated, laminated construction as described.

In either event, the plate 12 is provided with a plurality of finger receiving apertures or openings 22, 24 in order that it may be easily and conveniently held in the hand of the user, and it is also to be noted that the laminations 14 terminate in arcuate, concave surfaces 26 in the pockets 20, as is best shown in Figure 4.

A keeper channel 28 of a substantially L-shaped cross-sectional configuration is formed at the ends thereof with laterally angularly disposed ears 30 which, in turn, are pivoted by suitable bolts, screws or pins 32 to opposite side edges of the plate 12, the pivots 32 extending through suitable slots 34 with which the ears 30 are formed.

The invention is intended for use in association with a fishing line designated generally by the reference character 36, the same being of conventional type and including what may be referred to as a main line portion 38, a plurality of auxiliary line portions 40 which are secured at one end thereof to the main line portion 38 at predetermined intervals, and suitable fishing hooks 42 provided at the free ends of the auxiliary line portions 40.

When the fishing line 36 is not being used, the keeper channel 28 is simply swung to an open position as illustrated by the phantom lines 44 in Figure 4, whereupon the fishing hooks 42 may be applied or positioned in the pockets 20 by engaging their pointed extremities 46 with the arcuate or concave surfaces 26, one fishing hook being inserted in each pocket, substantially as shown.

Thereupon, the keeper channel 28 is simply swung to its closed position, and the fishing line portions 38, 40 may then be wound in any orderly fashion around the plate 12 and around the closed keeper channel 28, this winding of the fishing line being effected both longitudinally and transversely of the plate 12, as indicated at 40 in Figure 3.

Inasmuch as the wound fishing line passes around the keeper channel 28, the keeper channel will be prevented from "opening" to a position shown at 44, whereby the fishing hooks 42 will be effectively retained in the pockets 20 until such time as the fishing line is unwound from the holder, preparatory to use.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention what is claimed as new is:

A fishing line holder comprising a plate-like member adapted to have fishing lines wound around the same and consisting of a set of juxtaposed contacting laminations rigidly secured together, the laminations in the set being alternatively long and short to afford a set of fish-hook receiving notches located at one longitudinal edge portion of said member, end portions of the short laminations having concave surfaces engageable by pointed extremities of hooks positioned in said notches, a pair of pivot elements projecting laterally from the end laminations in the set, and a substantially U-shaped keeper including a pair of end portions and a bight portion having an L-shaped cross-section, the bight portion of said keeper being adapted to abut corner portions of the relatively long laminations and retain fish hooks in said notches, the end portions of said keeper being provided with slots, and said pivot elements being slidable and rotatable in said slots whereby the intermediate portion of the keeper may be laterally shifted and swung away from said member to permit removal of hooks from said notches.

MARION G. WOODARD.

REFERENCES CITED

The following references are of record in the file of this patent:

UNITED STATES PATENTS

| Number | Name | Date |
|---|---|---|
| 486,479 | Lancaster | Nov. 22, 1892 |
| 595,998 | Garland | Dec. 21, 1897 |
| 1,574,566 | Fiske | Feb. 23, 1926 |
| 1,578,631 | Bolton | May 30, 1926 |
| 1,625,754 | Tobita | Apr. 19, 1927 |
| 1,634,030 | Korkames | June 28, 1927 |
| 2,080,794 | Squassoni | May 18, 1937 |
| 2,094,834 | Bowman | Oct. 5, 1937 |
| 2,123,692 | Campos | July 12, 1938 |
| 2,391,371 | Watt | Dec. 18, 1945 |
| 2,477,800 | Harvey | Aug. 2, 1949 |

FOREIGN PATENTS

| Number | Country | Date |
|---|---|---|
| 213,772 | Great Britain | Apr. 10, 1924 |